United States Patent [19]
Mola

[11] Patent Number: 5,863,174
[45] Date of Patent: Jan. 26, 1999

[54] APPARATUS FOR PICKING UP POULTRY FROM BREEDING PENS

[76] Inventor: Enrico Mola, Via Santuario 40, 25030 Castelmella (Prov. of Brescia), Italy

[21] Appl. No.: 717,051

[22] Filed: Sep. 20, 1996

[30] Foreign Application Priority Data

Oct. 6, 1995 [IT] Italy .............................. MI95 A 002048

[51] Int. Cl.[6] .................................................. A01K 29/00
[52] U.S. Cl. .......................... 414/505; 119/846; 198/519; 198/312; 198/317; 414/528
[58] Field of Search ..................... 198/300, 301, 198/304, 311, 312, 315, 317, 512, 519, 861.6; 414/398, 434, 436, 505, 437, 528, 502, 503, 504, 435; 119/843, 845, 846

[56] References Cited

U.S. PATENT DOCUMENTS

| | | | |
|---|---|---|---|
| 1,832,965 | 11/1931 | Christopher | 198/519 |
| 3,389,780 | 6/1968 | Jerome | 198/312 X |
| 3,420,211 | 1/1969 | Hartvickson | 119/846 |
| 4,669,423 | 6/1987 | van den Brink | 119/846 |
| 4,813,526 | 3/1989 | Belanger | 198/317 X |
| 5,325,820 | 7/1994 | Briggs et al. | 119/846 |
| 5,699,755 | 12/1997 | Wills et al. | 119/846 |

*Primary Examiner*—Frank E. Werner
*Attorney, Agent, or Firm*—Guido Modiano; Albert Josif

[57] ABSTRACT

An automatic apparatus for picking up poultry in general from breeding pens and the like, including a pick-up assembly that is operatively associable with a transfer conveyor. The pick-up assembly comprises at least one conveyor with an inclined plane that is supported by a framework movable along the ground, a linking conveyor being also provided that operatively connects the inclined-plane conveyor to the transfer conveyor.

9 Claims, 4 Drawing Sheets

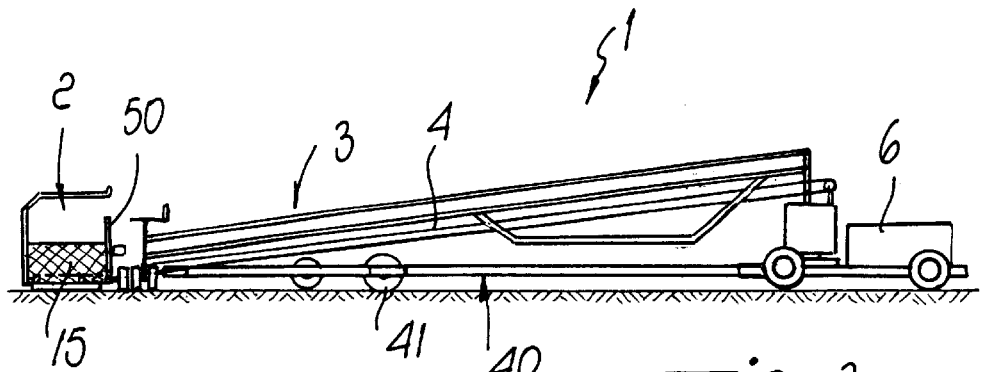
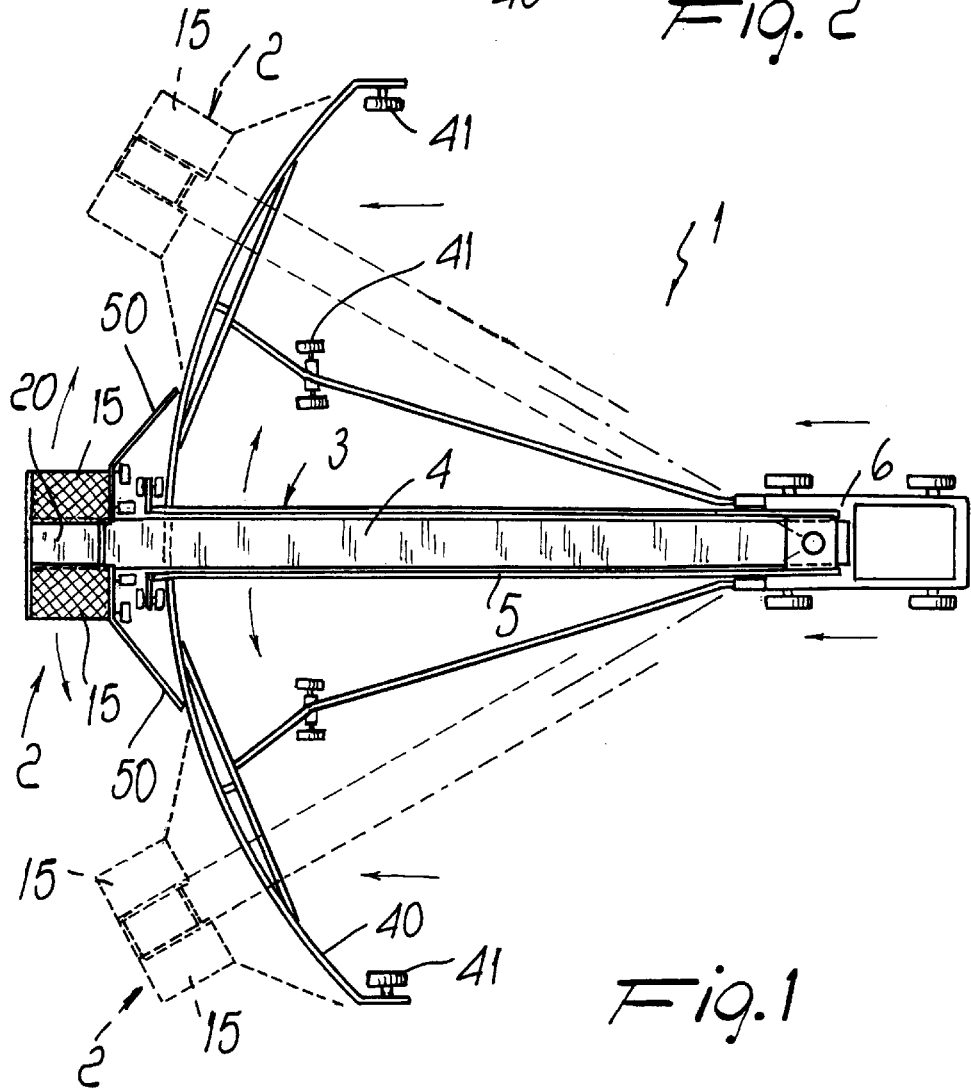

APPARATUS FOR PICKING UP POULTRY FROM BREEDING PENS

BACKGROUND OF THE INVENTION

The present invention relates to an automatic apparatus for picking up poultry in general from breeding pens and the like.

It is known that poultry such as chickens, turkeys, and the like are normally raised in sheds or pens wherefrom they must be removed when they have to be transferred to other areas. Currently, poultry is removed from pens by using devices that substantially have a swinging arm that is connected to a tractor that is made to advance in the pen, so as to pick up the poultry in succession.

The pick-up assembly is constituted, for example, by large contrarotating brushes that in practice take hold of the poultry and place it on the pick-up conveyor, which carries them away and places them for example in coops.

The use of a pick-up assembly constituted by large contrarotating brushes has not always proved itself advantageous, since the poultry may be maltreated and injured.

Furthermore, the above-described solution is structurally complicated and not always speedy enough from a practical point of view.

SUMMARY OF THE INVENTION

A principal aim of the invention is to solve the above problem, by providing an automatic apparatus for picking up poultry in general from breeding pens and the like that allows to pick up the poultry from the ground without damaging it and allows to always follow the contour of the ground correctly.

Within the scope of this aim, a particular object of the invention is to provide an automatic apparatus that allows to significantly increase the operating speeds and furthermore allows to always keep the poultry in the correct position, with no risk that some of the poultry might in practice avoid the pick-up assembly.

Another object of the present invention is to provide an automatic apparatus that is capable of giving the greatest assurances of reliability and safety in use by virtue of its particular constructive characteristics.

Another object of the present invention is to provide an automatic apparatus that can be easily obtained starting from commonly commercially available elements and materials and is furthermore competitive from a merely economical point of view.

This aim, these objects, and others that will become apparent hereinafter are achieved by an automatic apparatus for picking up poultry in general from breeding pens and the like, according to the invention, comprising a pick-up assembly that is operatively associable with a transfer conveyor, characterized in that said pick-up assembly comprises at least one conveyor with an inclined plane that is supported by a framework movable along the ground, a linking conveyor being furthermore provided which operatively connects said inclined-plane conveyor to said transfer conveyor.

BRIEF DESCRIPTION OF THE DRAWINGS

Further characteristics and advantages of the invention will become apparent from the following detailed description of a preferred but not exclusive embodiment of an automatic apparatus for picking up poultry in general from breeding pens and the like, illustrated only by way of non-limitative example in the accompanying drawings, wherein:

FIG. 1 is a schematic plan view of the automatic apparatus according to the invention;

FIG. 2 is a lateral elevation view of the automatic apparatus;

DESCRIPTION OF THE PREFERRED EMBODIMENT

Figure 3:
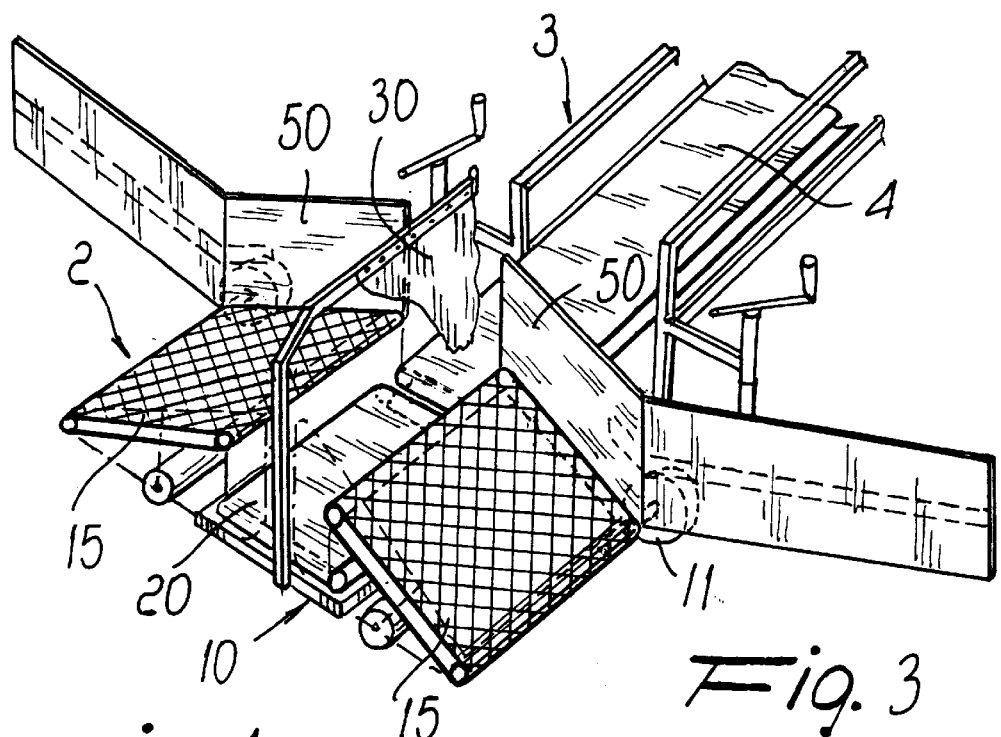
FIG. 3 is a schematic perspective view of the pick-up assembly.
Figure 4:
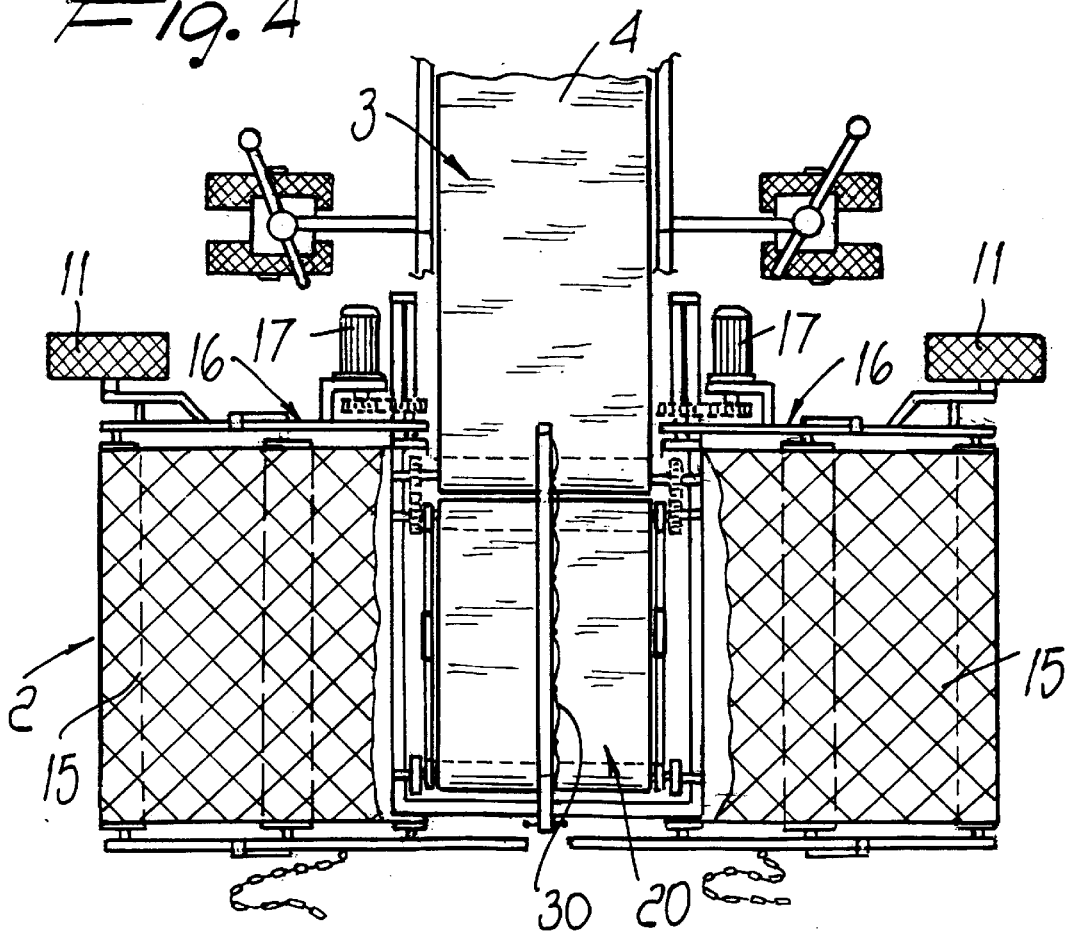
FIG. 4 is a top plan view of the pick-up assembly.
Figure 5:
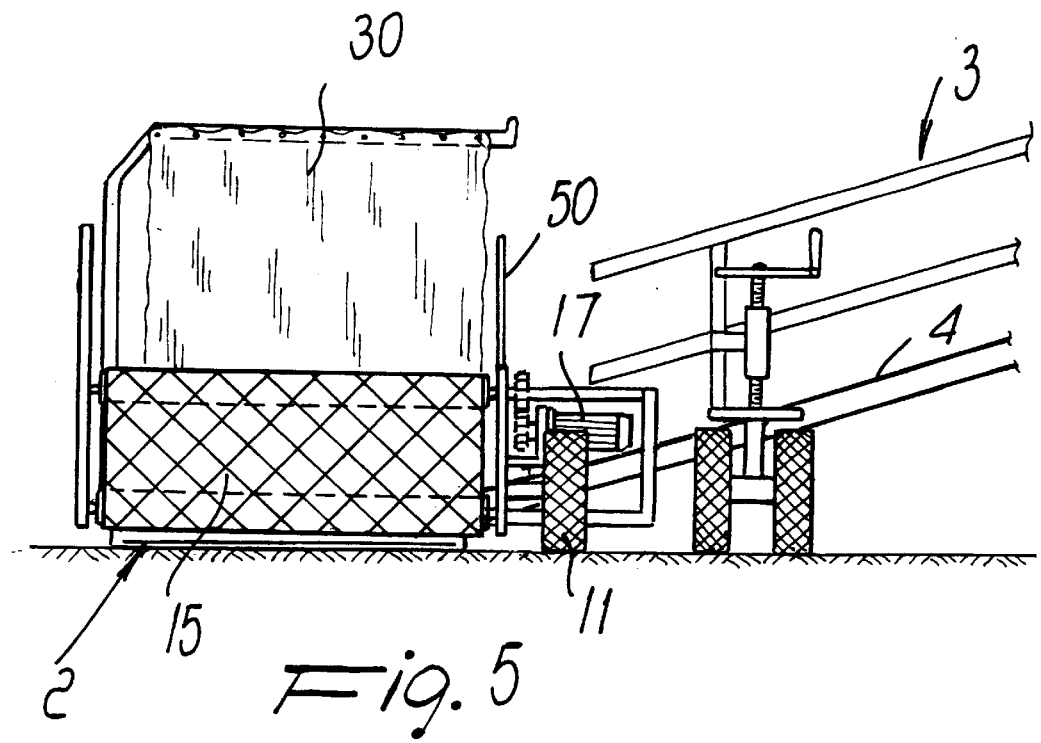
FIG. 5 is a side view of the pick-up assembly.
Figure 6:
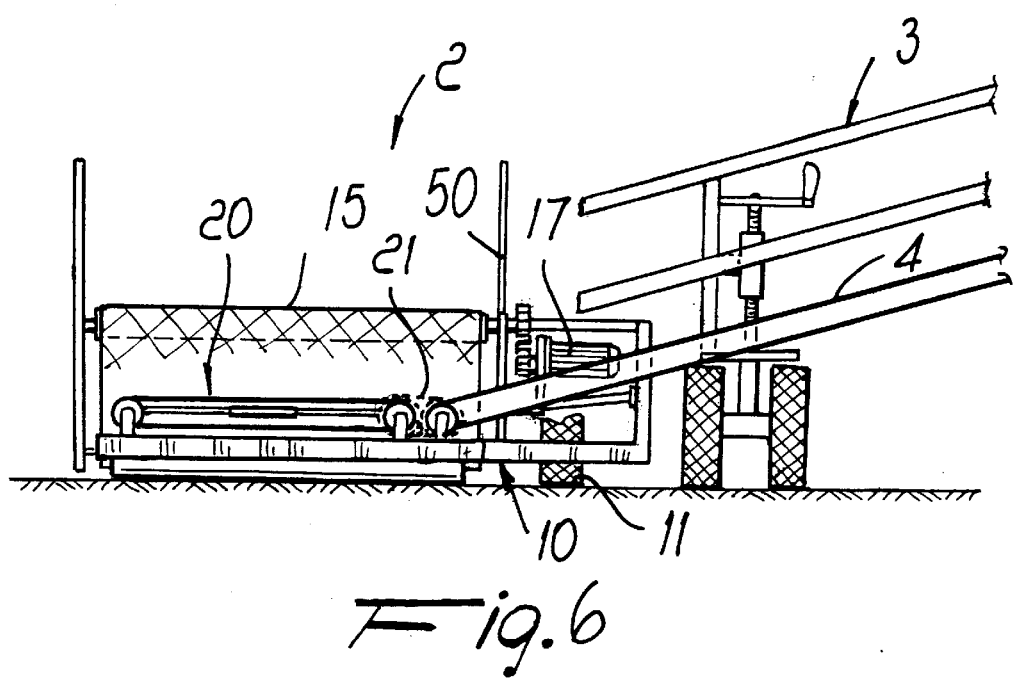
FIG. 6 is a side view of the pick-up assembly, illustrating the linking conveyor.
Figure 7:
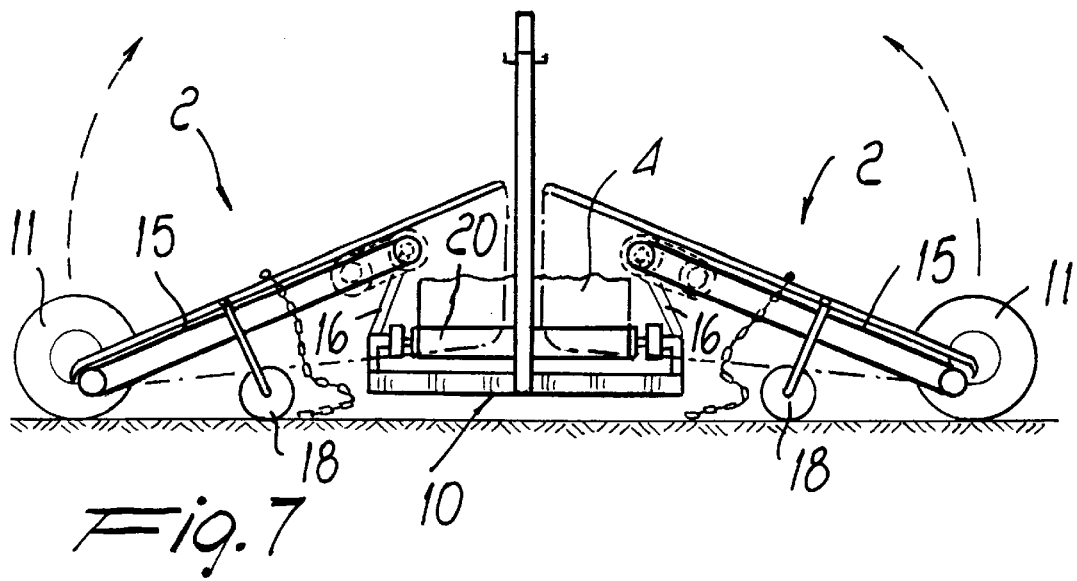
FIG. 7 is a front view of the pick-up assembly.

With reference to the above figures, the automatic apparatus for picking up poultry in general from breeding pens and the like, according to the invention, generally designated by the reference numeral 1, comprises a pick-up assembly 2 that is operatively connected to a transfer conveyor designated by the reference numeral 3.

The transfer conveyor 3 is constituted by a transfer belt 4 that runs continuously and is supported by a swinging framework 5 connected to a tractor or other self-propelled machine, designated by the reference numeral 6, which has the function of moving the apparatus inside the shed or pen where the animals are bred.

At the end of the transfer belt 4 it is possible to provide an automatic assembly that introduces the poultry in the coops or the like or other devices that can be required for the particular use.

A particular characteristic of the invention is that the pick-up assembly is constituted by a supporting framework, generally designated by the reference numeral 10, that supports two inclined-plane conveyors formed by inclined pick-up belts 15 that are arranged opposite to each other and are inclined so that their outer ends are at a lower level than the inner ends.

The pick-up belts are supported by tilt-down frameworks 16, to which the actuation motors 17 that turn said belt are connected; a roller feeler 18 is also provided that rests on the ground and has the purpose of adjusting the vertical position of the lower end of the pick-up belt, adapting to any discontinuities of the ground.

The framework 10 is moved by the swinging of the arm that supports the transfer conveyor, and the arrangement of the pick-up belts is such that their belt transfer direction is substantially perpendicular to the direction of motion of the arm.

At the end of the inclined pick-up belts there is provided a linking conveyor, designated by the reference numeral 20, that is arranged at a lower level than the end of the pick-up belts and is arranged on the continuation of the transfer belt 4, wherefrom it draws its motion by means of a transmission chain 21.

It should also be noted that a wall 30 is provided between the upper ends of the inclined-plane belts and has the purpose of better guiding the poultry as it falls from the inclined-plane belt to the linking belt.

The inclined-plane belts or ribbons have a contrarotating motion, in that they are arranged opposite to each other and move so as to impart a motion that is always directed towards the linking belt that is arranged centrally.

It should be added to the above that the tilt-down frameworks can be provided with ground resting wheels, designated by the reference numeral 11, that can be arranged at both sides.

Figure 9:
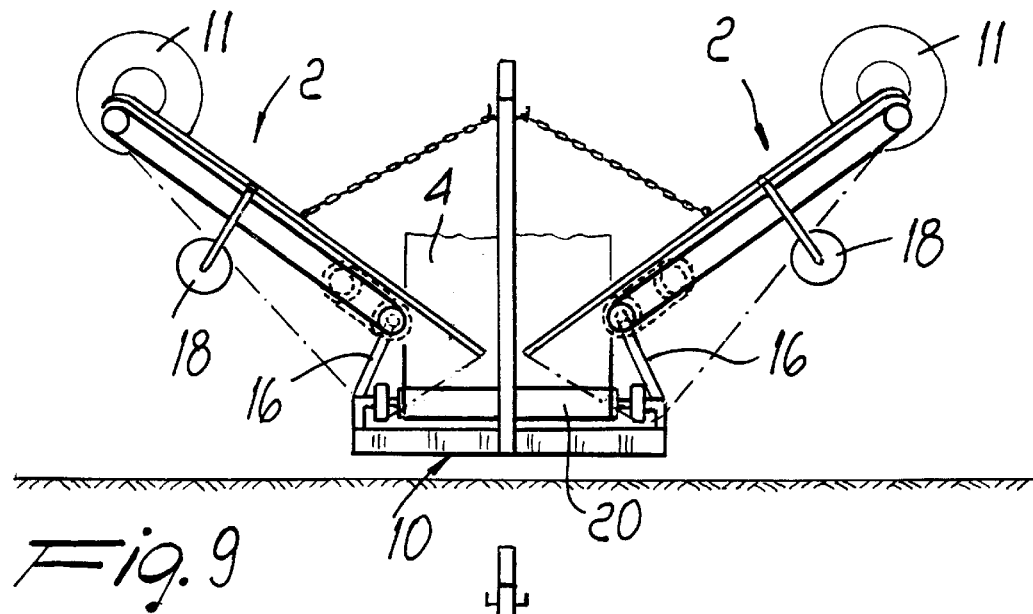
FIG. 9 is a front view of the pick-up assembly with the inclined-plane conveyors in the inactive position.
Figure 8:
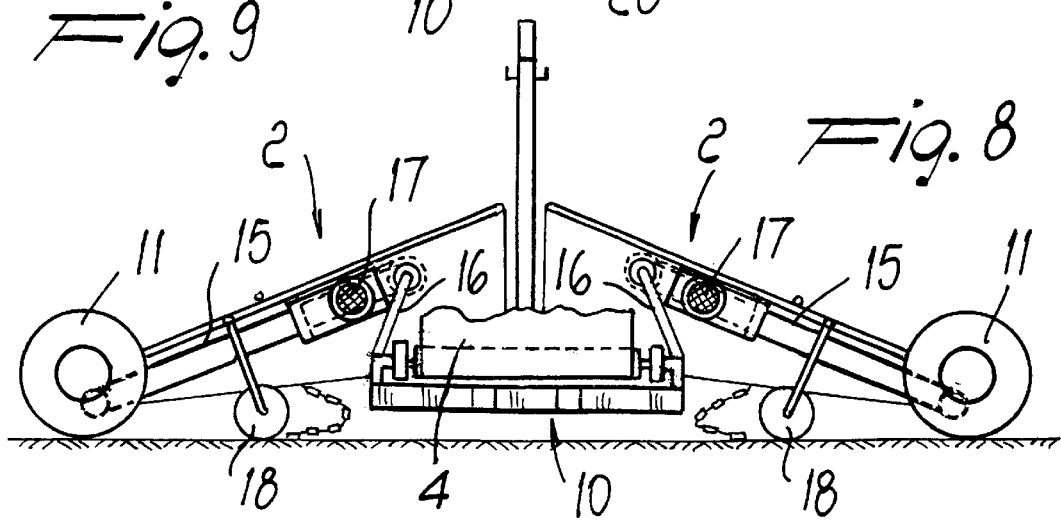
FIG. 8 is a rear view of the pick-up assembly in the operating position.

As shown schematically in FIG. 9, in the inactive position it is also possible to tilt the frameworks 16 so as to keep the pick-up belts raised.

In order to facilitate the transfer of the poultry, a guiding framework, designated by the reference numeral 40, is associated with the tractor 6 and is provided with its own supporting wheels 41; in practice, said guiding framework delimits the region for the movement of the pick-up assembly and prevents the poultry from climbing over the region where the pick-up assembly is operated.

It should also be added that the pick-up assembly is provided with guiding walls 50 that are arranged so that their ends are very close to said guiding framework.

In practical operation, once the apparatus has been placed in the shed, the tractor is caused to advance in order to position the pick-up assembly, which is moved by swinging the transfer conveyor 3, which in practice makes the pick-up assembly move along a circular arc in one direction, picking up all the poultry that lies within the region over which the pick-up assembly moves.

Once the pick-up assembly has reached one end, the tractor is made to advance by a certain extent, corresponding to the region affected by the previous pass of the pick-up assembly, and the swinging arm is caused to move in the opposite direction, so as to pick up the poultry with the other transfer belt.

The operations continue until the pen shed is completed.

The poultry is picked up without injury, since the inclined belts perfectly adapt to the ground and gradually and delicately lift each bird until it is at the upper end, where it is made to descend onto the linking conveyor that is arranged on the continuation of the transfer conveyor, which removes the bird.

The described arrangement is based on the use of two or at least one inclined plane and allows to easily pick up the poultry from the ground, furthermore adapting to the various contours of the ground.

The invention thus conceived is susceptible of numerous modifications and variations, all of which are within the scope of the inventive concept.

All the details may furthermore be replaced with other technically equivalent elements.

In practice, the materials employed, as well as the dimensions and the contingent shapes, may be any according to the requirements.

What is claimed is:

1. An automatic apparatus for picking up poultry from breeding pens, comprising:

a pick-up assembly that is operatively associable with a driven transfer conveyor, wherein said pick-up assembly comprises at least one driven pick up conveyor with an inclined plane that is supported by a driven swinging framework movable along the ground, said framework further supporting said transfer conveyor, a driven linking conveyor being furthermore provided which is arranged at a lower level than said inclined-plane conveyor and operatively connects said inclined-plane conveyor to said transfer conveyor, said pick-up assembly being subjected, by said swinging framework, to a horizontal movement along circular arcs on a guiding framework, the direction of motion of said at least one inclined-plane conveyor being substantially tangent to said direction of motion of the pick-up assembly.

2. An automatic apparatus according to claim 1, wherein said pick-up assembly being comprised of pick-up conveyors which are constituted by pick-up belts that are mounted on tilt-down frameworks connected to actuation motors to move said pick-up belts in opposite directions that convey towards said linking conveyor, said tilt-down frameworks being also connected to said linking conveyor.

3. An automatic apparatus according to claim 2, wherein a roller feeler is associated on each one of said tilt-down frameworks and is adapted to rest on the ground to adjust the vertical position of a lower end of said pick-up belt.

4. An automatic apparatus according to claim 2, further comprising a flexible partition interposed between terminal portions of said pick-up belts that are arranged at a higher level.

5. An automatic apparatus according to claim 2 wherein said tilt-down frameworks can be arranged in a raised position when said pick-up assembly is in an inactive position.

6. An automatic apparatus according to claim 1, wherein said transfer conveyor is constituted by a transfer belt that runs continuously and is supported by said swinging framework connected to a self-propelled machine.

7. An automatic apparatus according to claim 6, wherein said guiding framework is connected to said self-propelled machine, said guiding framework being arranged behind the pick-up assembly and under the transfer conveyor.

8. An automatic apparatus according to claim 7, further comprising guiding walls arranged laterally adjacent to said pick-up belts and connected to said guiding framework.

9. An automatic apparatus according to claim 1, wherein said pick-up assembly swinging framework is mounted on wheels and supports two inclined-plane pick-up conveyors that are arranged opposite to each other and the lowermost ends thereof are arranged outwards.

\* \* \* \* \*